்3,491,096
PYRIDAZONE DERIVATIVES AND PROCESS
FOR PREPARING SAME
Jacques Baetz, La Garenne-Colombes, France, assignor to SEPERIC, Fribourg, Switzerland, a Swiss body corporate
Filed Mar. 7, 1967, Ser. No. 621,180
Claims priority, application Great Britain, Mar. 10, 1966, 10,527/66
Int. Cl. C07d 57/22
U.S. Cl. 260—250    12 Claims

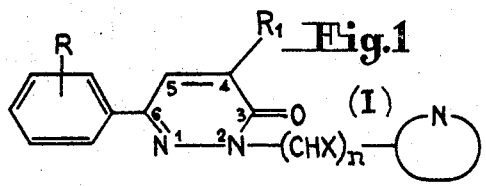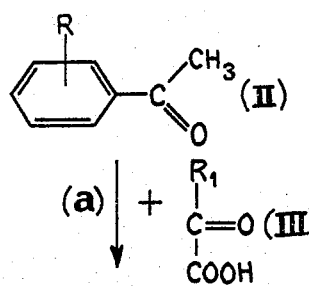

ABSTRACT OF THE DISCLOSURE

Pyridazone compounds useful as central nervous system agents.

---

The present invention relates to a family of new chemical compounds having therapeutic properties.

These compounds (I) are those of the general formula illustrated in FIG. 1 of the accompanying drawing, wherein R is hydrogen or at least a substituent in ortho-, meta-, or para-position consisting of halogen, an alkyl, alkoxy or hydroxy group, $R_1$ is an alkyl group having 1–4 carbon atoms, X is hydrogen or a lower alkyl group, $n$ is an integer equal to 1 or more, the various X's when $n$ is greater than 1, not being necessarily identical, and

is an optionally substituted $\alpha$-, $\beta$- or $\gamma$-pyridyl group, and their acid addition salts, particularly with pharmaceutically acceptable acids.

Thus, compounds (I) are substituted 6-phenyl-pyridaz-3-ones.

The compounds (I) have a psychotropic action, namely, they participate in treatments affecting the central nervous system of patients.

To prepare these compounds, a process analogous to that described by applicant in U.S. patent application Ser. No. 528,975, now Patent No. 3,441,565, and the main stages of which are illustrated in FIG. 2 of the accompanying drawing, is employed.

This process is characterized by the use, as starting materials, of $\alpha$-alcohol-$\gamma$-ketonic acids (IV) which are themselves prepared (stage $a$) by cold condensation, in the presence of potassium hydroxide or other alkaline base in methanol or some other suitable solvent, of arylketones (II) with the alkali metal salts of $\alpha$-ketonic acids (III). After neutralization and removal of the solvent in vacuo, the remaining solution is extracted in an acid medium with ether or some other suitable solvent. The desired acid (IV) is extracted by dissolution in a bicarbonate solution followed by precipitation in an acid medium.

Starting from the $\alpha$-alcohol-$\gamma$-ketonic acid (IV) thus obtained, the process according to the invention comprises condensing this acid or an ester thereof with an hydrazine of general formula $H_2N$—$NH$—$R_5$ wherein $R_5$ is hydrogen or a group:

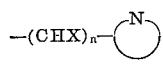

thereby obtaining a pyridazinone of formula:

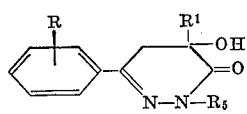

dehydrating this pyridazinone into the corresponding pyridazone and, when $R_5$ is hydrogen, introducing the

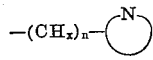

group by condensation with an halide of formula

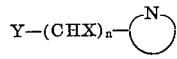

wherein Y is halogen, the dehydration and this condensation taking place in any order with respect to one another.

By this latter term is meant that condensation can be effected either prior to or after dehydration.

The various stages of the process will now be examined in greater detail with reference to FIG. 2. In the figure, for purposes of clarity, the case where, in hydrazine $H_2N$—$NHR_5$, $R_5$ is hydrogen is distinguished from the case where $R_5$ is

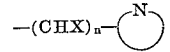

Thus, the condensation of the $\alpha$-alcohol-$\gamma$-ketonic acid (IV) with unsubstituted hydrazine (V) constitutes stage $b$, whereas condensation with substituted hydrazine (V bis) constitutes stage $b_1$.

The condensation with hydrazine according to stage $b$ or $b_1$ is carried out in a suitable solvent such as butanol which, owing to the formation of an azeotrope, permits the removal of the two molecules of water resulting from the condensation. It should be noted that this condensation can be carried out just as readily with the $\alpha$-alcohol-$\gamma$-ketonic acids (IV) in the form of simple esters (such as methyl, ethyl, etc.).

Thus, depending on whether route $b$ or $b_1$ is used, there are produced pyridazinones (VI) and (VI bis), respectively, which should then be dehydrated into the corresponding pyridazones.

Such dehydration effected with compounds (VI) constitutes stage $c$, and with compounds (VI bis) stage $c_1$.

It is carried out by moderate heating of the pyridazinone in solution in an acid medium, to produce the corresponding pyridazone which is separated by precipitation in cold water. As this dehydration concerns a tertiary hydroxyl group, it is effected with a very good yield. This is one of the original features and one of the great advantages of the process according to the present invention with respect to the prior technique, resulting from the selection, in accordance with the invention, of $\alpha$-alcohol-$\gamma$-ketonic acids (IV) as starting materials. It should be noted that this dehydration is not necessarily preceded by the isolation of the pyridazinone. In fact, stages $b$ and $c$ or $b_1$ and $c_1$ may be carried out as a single stage by heating acid (IV) with hydrazine (V or V bis) in acetic medium and in the presence of a small amount of hydrochloric acid.

Stage $c_1$ results directly in the production of therapeutically active pyridazone (I). On the other hand, when operating according to stage $c$, there is obtained pyridazone (VII) unsubstituted in the 2-position that should be further pyridyl-alkylated at said position. For this purpose (stage $d$), pyridazone (VII) is condensed with a pyridylalkyl halide (compound VIII, Y=halogen). The condensation may be effected in the presence of an alkali metal alkoxide such as sodium methoxide or ethoxide, within the corresponding alcohol. As a modification, this condensation may be effected within water, in the presence of an alkaline base such as sodium hydroxide.

For the sake of convenience in this disclosure, stages $c$ and $d$ are described above in that order of succession. This, indeed, is one of the possible procedures. However, stages $c$ and $d$ may occur in the reverse order (not illustrated, for purposes of clarity of the drawing). In the 3,491,096 latter case, pyridazinone (VI) is pyridylalkylated to produce compound (VI bis), which brings us back to the case already examined.

Pyridazones (I), of basic character, may be converted into appropriate salts, for example into hydrochlorides or organic acid salts to facilitate their utilization.

The examples below are given for the purpose of illustrating the invention.

In Examples 1 and 2, only stage $d$ of the process is described, since the preparation of 4-methyl-6-phenyl-pyridaz-3-one (compound VII, R=H, $R_1$=CH$_3$) used as starting material is already described in the above-mentioned patent application.

EXAMPLE 1

2-($\gamma$-picolyl)-4-methyl-6-phenyl-pyridaz-3-one (Compound I, R=H, $R_1$=CH$_3$, (CHX)$_n$=CH$_2$,  =$\gamma$-pyridyl)

In a 500 ml. flask, introduce 160 ml. of ethanol and 4.6 g. (0.2 atom-gram) of sodium, and add 0.2 mole of 4-methyl-6-phenyl-pyridaz-3-one (VII) with warming to dissolve. Then add a suspension of 0.2 mole of 4-chloromethyl-pyridine hydrochloride (VIII) and of 160 ml. of ethanol containing 4.6 g. of sodium. Heat under reflux during 5 hours. Allow to cool, and remove the sodium chloride by filtration. Evaporate the filtrate to dryness, in vacuo, dissolve the residue in 600 ml. of water containing 26 ml. of hydrochloric acid (S.G. 1.19). Cool in an ice-bath at +5° C. and precipitate the base by addition of 100 ml. of approximately 10 N caustic soda lye. After suction filtering and washing with water, there are obtained 55.3 g. of crude 2-($\gamma$-picolyl)-4-methyl-6-phenyl-pyridaz-3-one.

This base is converted into the hydrochloride or other salts according to the usual procedures. The hydrochloride melts (tube) at 209° C.

EXAMPLE 2

2-($\alpha$-picolyl)-4-methyl-6-phenyl-pyridaz-3-one (Compound I, R=H, $R_1$=CH$_3$, (CHX)$_n$=CH$_2$, =$\alpha$-pyridyl)

200 ml. of water containing 25 ml. of 36° Bé. caustic soda lye are heated at 70° C. in a water-bath. With stirring, there are added 18.62 g. (0.1 mole) of 4-methyl-6-phenyl-pyridaz-3-one (VII).

The temperature is brought up to 80–90° C. and stirring is continued until the mixture is dissolved.

There is added dropwise, over 30 minutes, an aqueous solution of 18.04 g. (0.11 mole) of 2-chloromethyl-pyridine hydrochloride (VIII) in 40 ml. of water, while maintaining the temperature at 80–90° C.; a red oil salts out.

Stirring is continued for a further 15 minutes, and the mixture is then cooled in an ice-bath at +5° C., with vigorous stirring, until the oil hardens and subsequently granulates (about 1½ hours).

Stirring is continued for a further 30 minutes.

After filtering and washing with water there are obtained 25 g. of crude 2-($\alpha$-picolyl)-4-methyl-6-phenyl-pyridaz-3-one.

This base is converted into the hydrochloride by the usual procedure.

Melting point: 226–228° C.

EXAMPLE 3

2-($\gamma$-picolyl)-4-methyl-6-m-chlorophenyl-pyridaz-3-one (Compound I, R=m-Cl, $R_1$=CH$_3$, (CHX)$_n$=CH$_2$  =$\gamma$-pyridyl)

In this example, the procedure of stages $b_1$ and $c_1$ is used, without isolating pyridazinone (VI bis) prior to its dehydration.

Condensation according to stage $b_1$ making use of $\gamma$-picolyl-hydrazine as compound (V bis), the preparation of the latter will be described first.

(1) $\gamma$-Picolyl-hydrazine.—Sodium hydroxide pellets (2.4 g., 0.06 mole) are dissolved in hydrazine hydrate (7.5 g., 0.15 mole) at 70° C. The mixture is cooled to room temperature (25° C.) and to it are added with stirring, portionwise, 4.92 g. (0.03 mole) of 4-chloromethyl-pyridine hydrochloride.

Heat is evolved, and the temperature is maintained at 35° C. by means of a cold water bath.

The mixture is stirred 15 minutes at 30° C.

To this are added 2 ml. of water, and excess hydrazine hydrate is then removed by distillation in vacuo, over a water-bath at 60° C.

There is obtained a red brown residue which is dissolved in 40 ml. of ethanol, and this solution is then distilled in vacuo, over a water-bath at 60° C., to remove the remaining water.

The residue is taken up with 40 ml. of ethanol, the sodium chloride is filtered off, and an alcohol washing is then carried out. To the filtrate there are added 30 ml. of butanol, and the mixture is distilled in vacuo over a water-bath, to remove the ethanol.

There is obtained a butanol solution of $\gamma$-picolyl hydrazine.

(2) Stage $b_1$.—In a 250 ml. flask there are dissolved 7.28 g. of $\gamma$-methyl-$\gamma$-hydroxy-$\gamma$-keto-$\gamma$-(metachlorophenyl)butyric acid (compound IV) (0.03 mole) in 40 ml. of normal butanol.

The butanol solution of $\gamma$-picolyl-hydrazine is added. The flask is fitted overhead with a stripping column (Vigreux column), and the butanol-water azeotrope distilling at 92° C. is then distilled at atmospheric pressure.

There are collected 0.3 to 0.4 ml. of water.

(3) Stage $c_1$.—The remaining butanol solution is brought to dryness, in vacuo, over the water-bath, the oily residue is taken up with 30 ml. of pure glacial acetic acid containing 1 ml. of pure concentrated hydrochloric acid.

The solution is placed in an oven at 100° C. during two hours.

The acetic solution is brought to dryness, in vacuo, over a water-bath, the residue is taken up with 25 ml. of chloroform, there are added 20 ml. of water, and, with stirring, there is added dropwise 10 N caustic soda lye until the pH of the aqueous phase becomes alkaline.

The organic phase is decanted and is extracted a second time with 25 ml. of chloroform.

The chloroform extracts are combined and are washed with water until neutral (4× 10 ml. of water).

The chloroform solution is dried over anhydrous sodium sulfate.

After filtering, washing with chloroform and bringing to dryness in vacuo over the water-bath, there is obtained a purplish-blue residue which is taken up with about 0.7 N hydrochloric acid (distilled water 90 ml., concentrated hydrochloric acid 7 ml.).

The insoluble matter is removed by filtration, the filtrate is cooled to 5° C. and, with vigorous stirring, is made alkaline with 10 ml. of 10 N caustic soda lye. A purple precipitate is obtained. This is allowed to rest three hours in an icebath, and is then suction filtered and washed with water until neutral.

This is then dried overnight in vacuo, at room temperature, in the presence of potassium hydroxide. There are obtained 4 g. of purple coloured 2-($\gamma$-picolyl)-4-ethyl-6-(metachlorophenyl)-pyridaz-3-one.

The yield is 42.5%.

To crystallize this compound, 4 g. of pyridazone are dissolved in 30 ml. of ethanol with slight warming, the solution is treated with charcoal during 15 minutes and is then filtered and washed with 2× 5 ml. of hot ethanol.

To the filtrate heated to boiling there is added water to incipient turbidity (about 50 ml.).

The pyridazone crystallizes on cooling. It is left overnight in the ice-chest.

It is then suction filtered, washed with 2× 5 ml. of 30% ethanol, and then with water.

It is then dried in vacuo, at room temperature, in the presence of potassium hydroxide.

There are obtained 2.5 g. of slightly colored product.

The yield of the crystallization is 62.5% and, thus, the yield of the reaction is 26.5%.

(4) Preparation of the hydrochloride.—2.25 g. of pyridazone base are dissolved in 16 ml. of acetone, in the hot.

Hydrochloric acid gas is bubbled through, and the hydrochloride crystallizes on cooling.

It is left to rest overnight in the ice-chest.

It is then suction filtered and washed with 2× 3 ml. of cold acetone. After drying overnight, in vacuo, at room temperature and in the presence of potassium hydroxide, there are obtained 2 g. of 2-($\gamma$-picolyl)-4-methyl-6-(m-chlorophenyl)-pyridaz-3-one hydrochloride. M.P.=210° C. Yield=76.4%.

Thus, the ultimate yield is 20.2%.

In Table I below are summarized the physical-chemical properties of the compounds obtained according to the above examples and other compounds according to the invention obtaines in analogous manner. In the table there is also given the $LD_{50}$, in mg./kg., of said compounds, determined in mice by the intraperitoneal route, except when otherwise indicated.

Were given a rating in excess or equal to 3 those compounds which extended by 3–4 seconds the reaction time of the animal at a dosage equivalent to ⅕ of the $LD_{50}$.

(c) The sedative activity, rated according to a scale of from one to three crosses, was appraised by means of a conventional system for the determination of the spontaneous activity in rats. The animals were placed in a circular enclosure through which a beam of light passed in several places, and the number of times the beam of light was interrupted by the passage of the animal were counted.

The results of these tests are summarized in the following table:

| Code No. | Analgesia | | Sedative action |
|---|---|---|---|
| | 1st test | 2d test | |
| 326 | 4 | 1.5 | ++ |
| 327 | 5 | 4 | +++ |
| 328 | 3 | 3.5 | +++ |
| 360 | 5 | 3 | + |
| 361 | 5 | 0 | + |
| 362 | 5 | 4 | + |
| 380 | 3 | 1.5 | + |
| 381 | 4.5 | 4.5 | ++ |
| 383 | 3 | 2.5 | ++ |
| 384 | 5 | 5 | ++ |

The antispasmodic activity was appraised by the conventional technique of the isolated intestine and all the

TABLE I.—PYRIDAZONES (I)

| R | $R_1$ | —(CHX)$_n$— | —N⟨⟩ | Empirical formula | Melting point, °C.¹ | Code No. | $LD_{50}$ |
|---|---|---|---|---|---|---|---|
| H | $CH_3$ | $CH_2$ | $\alpha$-Pyridyl | $C_{17}H_{15}N_3O$ | 226–228 | 326 | 260 |
| H | $CH_3$ | $CH_2$ | $\beta$-Pyridyl | $C_{17}H_{15}N_3O$ | 226 | 327 | 365 |
| H | $CH_3$ | $CH_2$ | $\gamma$-Pyridyl | $C_{17}H_{15}N_3O$ | 209 | 328 | 130 |
| H | —$CH_2CH_3$ | $CH_2$ | $\alpha$-Pyridyl | $C_{18}H_{17}N_3O$ | 190 | 360 | 2,500 |
| H | —$CH_2CH_3$ | $CH_2$ | $\beta$-Pyridyl | $C_{18}H_{17}N_3O$ | 183 | 361 | 340 |
| H | —$CH_2CH_3$ | $CH_2$ | $\gamma$-Pyridyl | $C_{18}H_{17}N_3O$ | 237–238 | 362 | 600 |
| m-Cl | $CH_3$ | $CH_2$ | $\beta$-Pyridyl | $C_{17}H_{14}N_3OCl$ | 176–177 | 380 | ² 1,400 |
| m-Cl | $CH_3$ | $CH_2$ | $\gamma$-Pyridyl | $C_{17}H_{14}N_3OCl$ | 210–211 | 381 | ² 350 |
| m-O$CH_3$ | $CH_3$ | $CH_2$ | $\beta$-Pyridyl | $C_{18}H_{17}N_3O_2$ | 165 | 383 | 330 |
| m-O$CH_3$ | $CH_3$ | $CH_2$ | $\gamma$-Pyridyl | $C_{18}H_{17}N_3O_2$ | 204 | 384 | 215 |

¹ Hydrochloride.
² Peros.

The pharmacological investigation of compounds (I) has demonstrated their sedative, analgesic and antispasmodic properties, a hypotensive effect being sometimes noted.

The compounds were submitted to two analgesia tests and to a sedative activity test, as follows:

(a) The first of the analgesia tests measures the inhibition of the number of twisting movements produced in mice on intraperitoneal injection of 0.25 ml. per mouse of a paraquinone solution containing 25 mg. of the compound per 100 ml.

The test compounds are administered to the animals ten minutes before the paraquinone injection and the twisting movements are counted during one hour for each animal. The analgesic activity noted was rated according to a scale from 1 to 5.

A rating of 4 and 5 was given to the compounds which inhibited these twisting movements by more than 70% at a dosage equivalent to ⅕ of the $LD_{50}$.

(b) The second analgesia test measures the reaction time of mice to immersion of the tail of the animal in water heated to a temperature of 58° C.

When no product has been administered to the animal, the animal moves its tail after 1½ seconds.

The test compounds are administered to the animal fifteen minutes before the first immersion; immersion of the tail is carried out every thirty minutes during 2.5 hours.

The noted activity was also rated according to a scale from 1 to 5.

aforesaid compounds were found to be substantially equally effective antispasmodics.

These analgesic, sedative and antispasmodic properties were also found in man, and are thus useful in human clinics.

For this purpose, the compounds (I), in free or salt form, may be administered by the oral, parenteral or rectal route, at a daily dosage regimen of 100 mg. to 2 g. The injectable route is particularly suitable for the water-soluble compounds; however, the water-insoluble products may be injected in the form of suspensions, or by using another solvent.

For such administrations, the compounds are formulated as therapeutical compositions with the vehicles or excipients suitable for these various routes of administration. The compositions formulated in unit dosage form such as tablets, suppositories and ampoules contain preferably from 100 to 400 mg. of compound.

Examples of suitable formulations are given below only for illustrative purposes.

(A) Formulation for ampoules:
 Compound No. 328 _____ mg__ 100
 Sterile pyrogen-free water, q.s. to make 5 ml.
(B) Formulation for one tablet:
 Compound No. 381 _____ mg__ 250
 Lactose, starch, talcum, q.s. for 1 tablet finished at 400 mg.
(C) Formulation for one suppository:
 Compound No. 384 _____ mg__ 200
 Semi-synthetic glycerine, q.s. for a 2 g. suppository.

Having now described my invention what I claim as new and desire to secure by Letters Patent is:

1. A compound of formula:

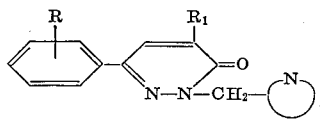

wherein:

R is at least a substituent in any one of the ortho-, meta- and para-positions, selected from the group consisting of hydrogen, halogens and lower alkoxy and hydroxy groups, $R_1$ is an alkyl group having 1–4 carbon atoms, and

is a member selected from the group consisting of α-, β- and γ-pyridyl groups, and the pharmaceutically acceptable acid addition salts of said compounds.

2. 2 - (β - picolyl) - 4 - methyl - 6 - phenyl - pyridaz-3-one and the pharmaceutically acceptable acid addition salts thereof.

3. 2 - (γ - picolyl) - 4 - methyl - 6 - phenyl - pyridaz-3-one and the pharmaceutically acceptable acid addition salts thereof.

4. 2 - (γ - picolyl) - 4 - ethyl - 6 - phenyl - pyridaz - 3-one and the pharmaceutically acceptable acid addition salts thereof.

5. 2 - (γ - picolyl) - 4 - methyl - 6 - (m - chloro) phenyl-pyridaz-3-one and the pharmaceutically acceptable acid addition salts thereof.

6. 2 - (γ - picolyl) - 4 - methyl - 6 - (m - methoxy) phenyl-pyridaz-3-one and the pharmaceutically acceptable acid addition salts thereof.

7. Process for the preparation of compounds of general formula:

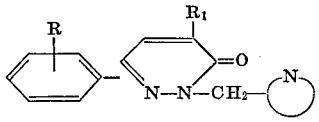

wherein:

R is at least a substituent in any one of the ortho-, meta- and para-positions, selected from the group consisting of hydrogen, halogens and lower alkoxy and hydroxy groups, $R_1$ is an alkyl group having 1–4 carbon atoms, and

is a member selected from the group consisting of α-, β- and γ-pyridyl groups, comprising heating in an organic solvent a compound selected from the group consisting of α-alcohol-γ-ketonic acids of formula:

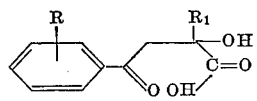

wherein R and $R_1$ have the above defined meanings, and the esters of said acids, with a hydrazine of formula $H_2N-NH-R_5$, wherein $R_5$ is a member selected from the group consisting of hydrogen and

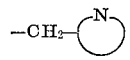

groups, thereby obtaining a pyridazinone of formula:

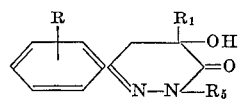

dehydrating this pyridazinone by heating same in an acid medium into the corresponding pyridazone and, when $R_5$ is hydrogen, introducing the

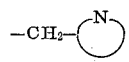

group, by condensation in an alkaline medium with an halide of formula

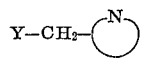

wherein Y is halogen, the dehydration and this condensation taking place in any order with respect to one another.

8. Process as claimed in claim 7, wherein said organic solvent is one forming an azeotrope with water.

9. Process as claimed in claim 7, wherein the α-alcohol-γ-ketonic acid and the hydrazine are heated in acetic acid in the presence of hydrochloric acid, thus ensuring simultaneously the dehydration of the pyridazinone produced.

10. Process as claimed in claim 7, wherein the condensation with the halide of formula

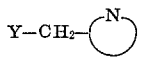

is carried out in the presence of an alkali metal alkoxide within the corresponding alcohol.

11. Process as claimed in claim 7, wherein the condensation with the halide of formula

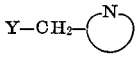

is carried out in the presence of an alkaline base within water.

12. Process as claimed in claim 7, wherein the α-alcohol-γ-ketonic acid is prepared by treating in the presence of an alkaline base an aryl-ketone of formula:

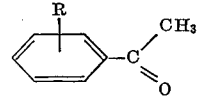

with an alkali metal salt of an acid of formula

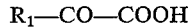

wherein R and $R_1$ have the above defined meanings.

References Cited

UNITED STATES PATENTS 3,012,032   12/1961   Gever et al.

FOREIGN PATENTS 1,355,220   4/1963   France.

NICHOLAS S. RIZZO, Primary Examiner

U.S. Cl. X.R.

424—250